(12) United States Patent
Fischer (10) Patent No.: US 7,657,795 B2
(45) Date of Patent: Feb. 2, 2010

(54) METHOD AND APPARATUS FOR WRITING TO A TARGET MEMORY PAGE OF A MEMORY

(75) Inventor: Wieland Fischer, Munich (DE)

(73) Assignee: Infineon Technologies AG (DE)

( * ) Notice: Subject to any disclaimer, the term of this patent is extended or adjusted under 35 U.S.C. 154(b) by 417 days.

(21) Appl. No.: 11/680,156

(22) Filed: Feb. 28, 2007

(65) Prior Publication Data

US 2007/0214329 A1 Sep. 13, 2007

(30) Foreign Application Priority Data

Feb. 28, 2006 (DE) .................. 10 2006 009 214

(51) Int. Cl.
*G06F 11/00* (2006.01)
(52) U.S. Cl. ........................................ 714/42
(58) Field of Classification Search .............. None
See application file for complete search history.

(56) References Cited

U.S. PATENT DOCUMENTS 6,000,004 A * 12/1999 Fukumoto .................. 711/103

7,117,402 B2 * 10/2006 Di Zenzo et al. ............ 714/716
7,421,624 B2 * 9/2008 In et al. ...................... 714/53
2006/0218339 A1 9/2006 Fischer et al.

FOREIGN PATENT DOCUMENTS

| DE | 103 22 723 B3 | 10/2004 |
| DE | 103 40 010 A1 | 4/2005 |
| DE | 103 40 010 A1 | 4/2005 |

* cited by examiner

*Primary Examiner*—Michael C Maskulinski
(74) *Attorney, Agent, or Firm*—Dickstein, Shapiro, LLP.

(57) ABSTRACT

A method and apparatus for writing to a target memory page of a memory has an initial memory page having allocated thereto a marking memory containing information whether a content of the initial memory page is written correctly to the target memory page. The apparatus includes a memory controller for determining whether the target memory page has an error, if the target memory page has an error, for erasing it, if the marking memory indicates that the target memory page is not written correctly, for writing the target memory page based on the initial memory page, if the target memory page is written correctly, for changing the marking memory such that the marking memory indicates that the target memory page is written correctly, and if the marking memory of the initial memory page indicates that the target memory page is written correctly, for erasing the initial memory page.

20 Claims, 5 Drawing Sheets

METHOD AND APPARATUS FOR WRITING TO A TARGET MEMORY PAGE OF A MEMORY

CROSS-REFERENCE TO RELATED APPLICATION

This application claims priority from German Patent Application No. 102006009214.7, which was filed on Feb. 28, 2006, and is incorporated herein by reference in its entirety.

BACKGROUND OF THE INVENTION

1. Field of the Invention

The present invention refers to a method and an apparatus for writing to a target memory page of a memory, the memory specifically being a UCP-EEPROM (UCP-EEPROM=uniform channel programming electrically erasable read only memory).

2. Description of the Related Art

EEPROM memories (EEPROM=electrically erasable read only memory) make it possible to store data that remain after a supply voltage was disconnected from the respective EEPROM memory. Due to the possibility to construct very compact EEPROM memories, these memories are advantageously used in the field of mobile processor means and mobile memories. EEPROM memories are specifically used in the field of chip cards and smart cards, which are for example used for the protection of safety-relevant and sensitive areas and data. Due to the value alone of goods, privileges and data protected directly or indirectly by such EEPROM memories, the latter are targets of attacks such as systematic interruption of the supply voltage or the supply power, which is also termed tearing or tearing attack.

The so-called UCP-EEPROM memories represent a subspecies of the EEPROM memories. In order to save on space on a chip including the EEPROM memory, the bit/byte switches are omitted in one EEPROM cell field in the UCP-EEPROMs. In addition, the memory is organized in memory pages. Here a memory page consists of a number of bytes, half words or words, a word for example including 32 bits or 4 bytes. A memory page then includes for example 64 or 128 bytes.

In a memory page, single bits and bytes cannot be erased individually anymore, that is for example be set to a value of 0. Basically, it is possible to write single bits subsequently, that is subsequently set them to a state representing the value of 1 from a state representing the value of 0. While for many applications this may be a theoretically feasible procedure, it makes little sense for a known write operation to a memory, in which single bits are to be changed, since for example with using error detecting codes (EDC) or error correcting codes (ECC), it cannot be ruled out that single bits may have to be erased, that is brought into a state corresponding to a value of 0. This is, however, generally not possible for UCP-EEPROM memories because, as discussed above, single bits and bytes cannot be erased individually. Thus subsequent writing of a single bit would probably lead to a corruption of the ECC information or the EDC information. In other words, the use of the possibility of postprogramming or postwriting single bits makes little sense in the case of an ECC or EDC functionality incorporated into a memory.

This means, however, that for changing only one bit, byte or data word of the data of this page, the entire memory page must be erased and then written anew. This means that, starting from the erased state of the memory page, the bits to be written are written while the other bits change their states only subtly or not at all in terms of physics. Here the data of the memory page to be changed must be buffered in the meantime so that there is no loss of data in the case of a power failure.

In order to avoid meantime buffering of the memory page as described above, a so-called spare page is used. For this purpose, in addition to the architecture described above, the EEPROM cell field is organized by introducing so-called sectors. Here a number of memory pages are allocated to a sector S. Thus for example 32 memory pages (P1, . . . , P32) are collected in sector S. In order to avoid buffering a memory page to be programmed prior to erasure, a further memory page P0 is added to the sector, which helps to avoid time consuming EEPROM programming in the context of the buffering. This memory page P0 is present in an erased state and serves as a spare page. For programming, the potentially changed content of a memory page, for example memory page P25, is written to memory page P0. After the content has been checked in the new memory page P0, the old memory page P25 is erased and memory page P0 accordingly mapped to the memory. The erased memory page P25 now takes over the role of the old memory page P0. The respective erased memory page is termed the spare page.

As in this way the memory pages are no longer available in their original order in the sector but are "jumbled up" due to several programming processes, some additional bits, forming a so-called MapBlock or memory for a logical address of a memory page, are added to each memory page. To this MapBlock the so-called MapAddress or logical address of the memory page is written. Thus the introduction of the MapAddress and/or the MapBlock makes it possible to allocate a (logical) memory address to each physical memory page. This information must not be lost, not even due to a reset or current loss or tearing. In the MapBlock of each page, a number between 0 and 31 is then available as the MapAddress, if the respective memory page is no erased. Thus the MapAddress identifies a position of the respective memory page in a memory space that is, for example, in sector S. This makes an allocation of memory addresses and the respective physical page possible.

Thus, under normal operating conditions, in a sector S there is an erased memory page, the so-called spare page, and, starting from the above example, 32 data memory pages (data pages). Thus the 32 MapBlocks, each allocated to a memory page, have each logical address between 0 and 31 exactly once. Thus to each physical memory page, exactly one logical memory address representing the position of the respective physical memory page in the memory space, is allocated.

In the cell concept of the EEPROM memories, a write operation to a memory page of a sector causes a mostly slight disturb of all cells of all other pages of this sector. However, even if the cells of the other memory pages are disturbed only a little, this is still a cumulative effect which, as the case may be, may lead to a loss of data and/or to a reduction of the data integrity. In order to counter these disturbs, the concept of the refresh has been introduced. Here for example either memory pages are selected at random from time to time and copied afresh, or a time stamp, which is also termed DisturbCounter and which indicates which memory page is particularly "old", is deposited for example into the MapBlock.

In connection with a supply voltage interruption, this, however, results in the following problem. If, for example by a tearing attack, power supply is interrupted during a programming process, that is during writing the new page and erasing the old page, two problematic scenarios may arise:

A. If a supply voltage interruption occurred during the write operation, the memory pages to which no new data was written during the programming process have already been subject to a disturb. In other words, these memory pages have already "seen" a disturb, which has disturbed the same. If then the invalid memory page generated in the interrupted write operation is erased, the sector with the old unchanged data will be restored, however, the information that a disturb has occurred will no longer be available and therefore lost. The same must subsequently be deposited in the form of a digital value in an (arbitrary) memory page of the respective sector. This can be effected for example by increasing the DisturbCounter. However, an attacker could in this moment interrupt the current supply again and the information on the disturb occurred would be irretrievably lost. In this way an attacker may succeed in introducing a large amount of disturbs into a sector without the system, that is the memory, being able to detect the same. The data integrity of the sector would deteriorate in the course of time so that it is possible that after a certain period of time the sector may even contain incorrect data.

B. If the current supply interruption occurred at the end of the write routine and/or the beginning of the erase routine, there will be a sector that comprises two more or less good memory pages, which are associated to the same logical address by the MapBlock. In this case a decision must be made, which memory page to keep and which memory page to release as the spare page. If for example the older memory page is kept and the younger memory page is erased, there will be the danger that the old memory page has only been "partly erased" in the course of the erase operation and can therefore no longer offer the required data integrity. In other words, it is possible in this case that the old memory page is no longer able to guarantee the required data holding. On the other hand, if the younger page is kept and the older one erased, it could well be that the new memory page will not yet have been completely written and will therefore also not be able to guarantee the required data holding.

Independent of which of the two memory pages is to be kept and which is to be released as the spare page, it is possible to erase one page and copy the other one to the location of the erased page. However, a supply voltage interruption (tearing) at exactly this moment in time could cause the information of wanting to copy the one page to be lost again.

German patent specification DE 10322723 refers to an apparatus and a method of processing a state of a memory. The method in its utilization as a tearing service algorithm described therein can limit the problems discussed above. This tearing service algorithm is described in the following and is able to detect a tearing attack and log all disturbs without exception.

Figure 5:
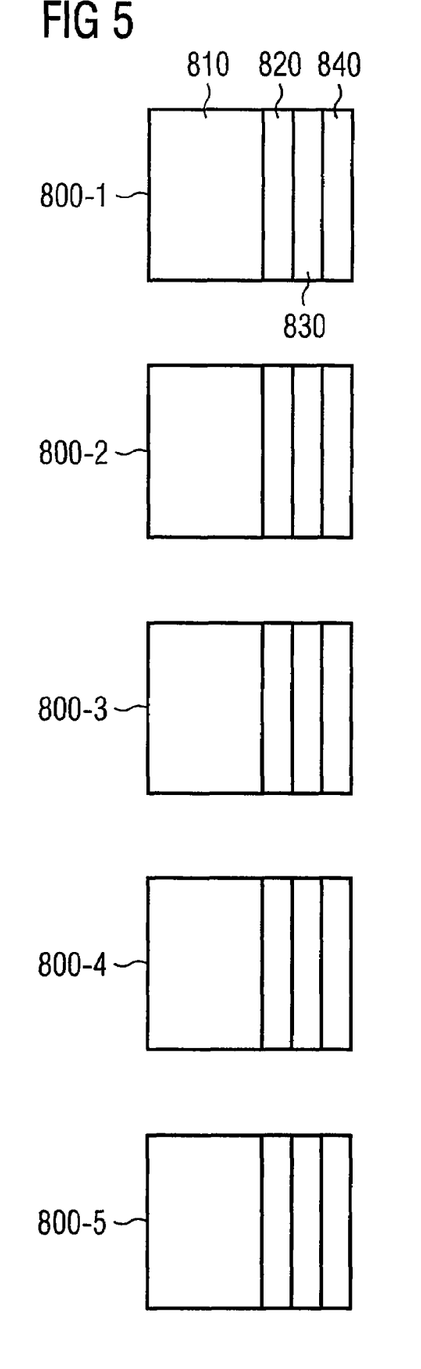
FIG. 5 is a representation of a known memory.

FIG. 5 shows a schematic representation of a structure of a memory or a sector of a memory as described in DE 10322723. The memory or sector comprises a plurality of memory pages 800-1 to 800-5, each of the memory pages 800-1 to 800-5 including a data area 810 for storing data, an allocation block or MapBlock 820, a marking area 830, and a time stamp area 840 for storing the DisturbCounter.

Figure 6:
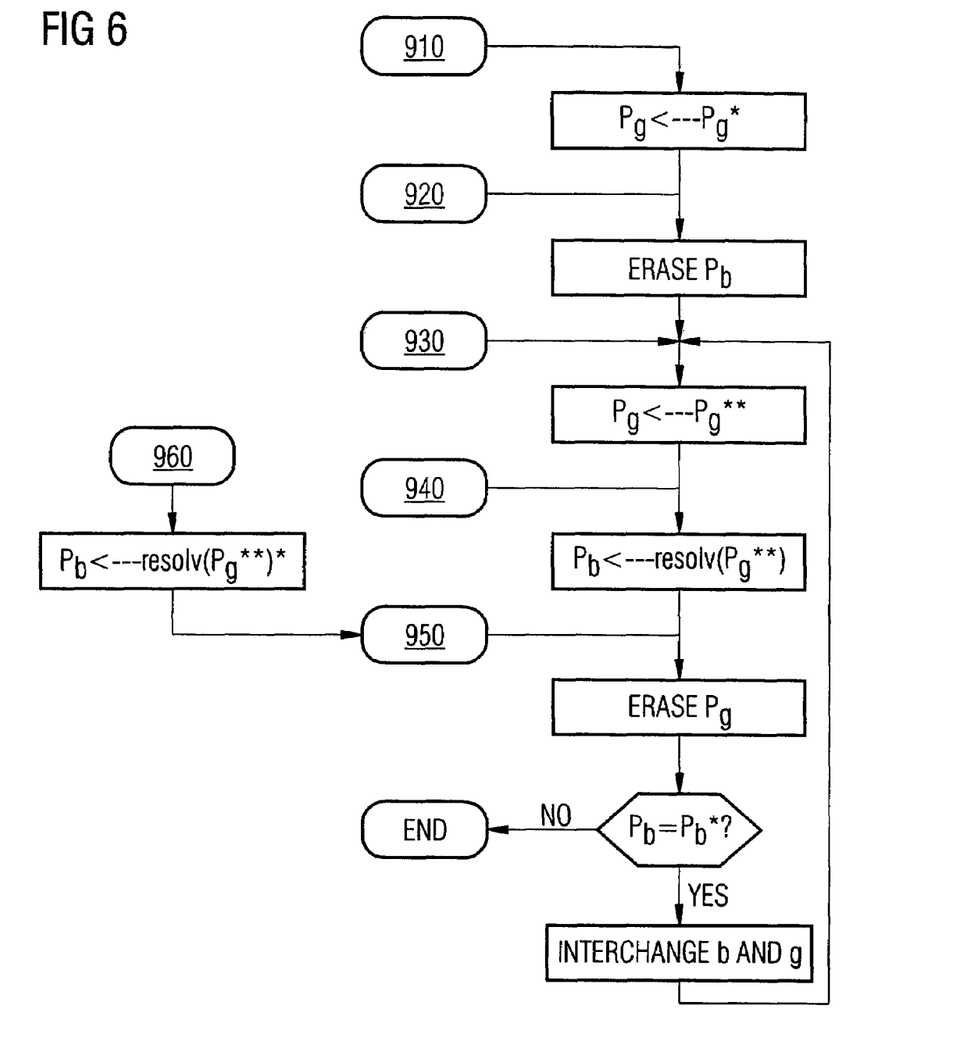
FIG. 6 shows a flow chart of a known method of processing a state of a memory.

FIG. 6 shows a flow chart of a known method of processing a state of a memory. More precisely, FIG. 6 shows a part of a tearing service algorithm that is begun by a step shown in FIG. 6 after a start of the algorithm and an (optional) check of memory pages 800-1 to 800-5 of the sector of the memory. If a memory page $P_g$ is to be copied to an empty memory page $P_b$ being the spare page of the sector, and if an optionally performed analysis of the sector shows an error, for example in the form of erroneous memory pages, memory page $P_g$ will be marked in a first step 910. For this purpose, a bit designated as TearingFlag TF1, is postprogrammed in marking block 830 of memory page $P_g$, which is identified in FIG. 6 by the designation $P_g^*$. Such postprogramming of TearingFlag TF1 may be performed in the context of the UCP-EEPROM concept, as discussed above. Under normal operating conditions, TearingFlag TF1 is erased, that is has the value 0.

Subsequently, memory page $P_b$ is erased in a second step 920. Following this, a second TearingFlag TF2 including marking block 830 of memory page $P_g$ is programmed and/or written in a process step 930, so that TearingFlag TF2 also has the value 1. This is identified in FIG. 6 by the designation $P_g^{**}$.

In a next step 940 memory page $P_g$ is copied to memory page $P_b$, wherein on the one hand to time stamp area 840 of memory page $P_b$ a correspondingly increased DisturbCounter is stored in the process and on the other hand the two TearingFlags TF1 and TF2 are erased and/or programmed with a value of 0. The content copied to memory page $P_b$ and based on memory page $P_g$ marked by the two TearingFlags TF1 and TF2 is also referred to as resolvent of $P_g^{}$, which in the context of the figures in the present application is also referred to as resolv($P_g^{}$) and r($P_g^{**}$).

In a following step 950 the original memory page $P_g$ is erased and thus becomes the new spare page. As TearingFlag TF1 of memory page $P_g$ was not copied during copying step 940, so that TearingFlag TF1 of memory page $P_b$ also has the value 0, the tearing service algorithm is ended in a next step.

Figure 7:
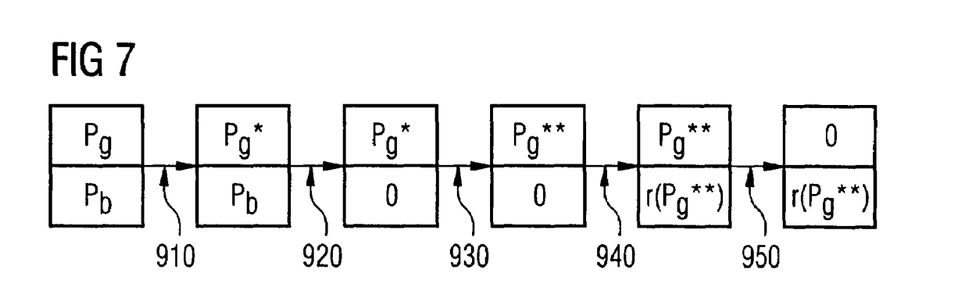
FIG. 7 is a representation of the contents of two memory pages in the context of the known method of processing a state of a memory.

FIG. 7 illustrates the content of the two memory pages $P_g$ and $P_b$ affected in the context of the tearing service algorithm described. Here the contents of the two memory pages $P_g$ and $P_b$ are represented in the form of six rectangles, each having an upper and a lower half. More precisely, FIG. 7 thus shows the change of the content of the physical memory pages by method steps 910-950. In the upper halves of the rectangles the content of memory pages $P_g$ is represented, and in the lower halves the content of memory page $P_b$ is represented. Here $P_g$ and $P_b$ also designate the original contents of the two memory pages prior to starting the tearing service algorithm. Under normal operating conditions, memory page $P_b$ is the spare page, so that it should be present in an erased state, which in the context of the description in FIG. 7 could be identified by a zero. However, in order to furthermore enable a description of memory contents possible as a result of a tearing attack, memory page $P_b$ also has a content that does not necessarily have to correspond to the content of an erased memory page.

Starting from the contents $P_g$ and $P_b$ memory page $P_g$ is marked by marking step 910, which is emphasized by the superscript asterisk. Memory page $P_b$ is erased by erase step 920, which is symbolized in FIG. 7 by the entry 0. The second TearingFlag TF2 of memory page $P_g$ is set by marking step 930, which is represented in FIG. 7 by the marking $P_g^{}$. In step 940 the resolvent of memory page $P_g^{}$ is written to memory page $P_b$, which is represented in FIG. 7 by the designation r($P_g^{}$). Subsequently, memory page $P_g$ is erased in erase step 950**.

In the following, the function of the method and/or the tearing service algorithm described in FIG. 6 is discussed in closer detail according to a known method under tearing conditions or attack conditions. In order to complete the algorithm, the tearing service algorithm must be able to find to an appropriate location and/or a correct location from any location of the tearing service algorithm after an interruption of the supply voltage (tearing). This must be ensured even if a repeated number of interruptions takes place during the tearing service algorithm. All this must be performed without disturbs being forgotten or overlooked. If as a result of case B described above two memory pages have the same logical address in MapBlock 820, that is, if there is a so-called DoubleMapping, the method discussed will be started with method step 910. Here the fundamental decision must be made, which of the two memory pages affected is to be kept and which is to be erased. If the fundamental decision is made, that the younger page, that is the page time stamp area 840 of which indicates a younger age, will be kept, this memory page is treated as memory page $P_g$ and the older memory page is processed as memory page $P_b$ in the context of the method described in FIG. 6. Thus the following occurs: First memory page $P_g$ is marked by TearingFlag TF1 so that from this moment on it can always be determined that a tearing service algorithm was initiated. In the case of an interruption of the supply voltage at the beginning of the tearing service algorithm, that is before TearingFlag TF1 is written and thus becomes "visible", a DoubleMapping will again be detected in the case of a restart of the tearing service algorithm, and the algorithm begins afresh.

Subsequently, memory page $P_b$ is erased. Thus, if the chip comprising the memory finds a sector with a memory page, in which only TearingFlag TF1 is set, and a second memory page, to which the same logical address is allocated, the tearing service algorithm will be completed beginning with method step 920. If the sector analogous has exactly one memory page with a TearingFlag TF1 set, with TearingFlag TF2 is not set, and also has an erroneous memory page, which in this case is a memory page not completely erased, the tearing service algorithm will also be completed with step 920, that is the erasure of the memory page $P_b$ not completely erased. However, if the sector has a memory page with a TearingFlag TF1 set, and TearingFlag TF2 not set, and also has an erased memory page, the interruption of the supply voltage has occurred at the end of method step 920, that is at the erasure of memory page $P_b$, so that in this case the tearing service algorithm can be continued with step 930.

In step 930 TearingFlag TF2 of memory page $P_g$ is set, and in the following step 940 the content of memory page $P_g$ is copied to spare page $P_b$ with a correspondingly increased DisturbCounter. Thus setting the second TearingFlag TF2 in memory page $P_g$ marks the transition from erasing memory page $P_b$ (step 920) to the step of writing of memory page $P_b$ (step 940).

Thus, when the sector of the memory has a memory page with both TearingFlags TF1 and TF2 set, that is, has memory page $P_g$ and an erroneous memory page, then the tearing service algorithm was interrupted in the area of method steps 940 and/or 950. As in this case memory page $P_b$, that is the former spare page, cannot be erased, as this would lead to a loss of the information referring to the disturb in the form of the correspondingly increased DisturbCounter, memory page $P_b$ must first be written completely. In principle, however, this is possible as it is clear, which information is to be written to memory page $P_b$, that is the content of memory page $P_g$ with a correspondingly increased DisturbCounter and erased TearingFlags, that is the resolvents of $P_g$. The difficulty here is that memory page $P_b$ has experienced somewhat more than one write operation. In principle, memory page $P_b$ may be subjected to up to three write operations. This involves a certain risk that due to the disturbs accompanying the programming and/or writing of memory page $P_b$, the erased bits, that is those bits of the page the value if which is 0 are also no longer optimal. The result may be a reduced life expectancy of the data stored in the respective memory page, that is a reduced data guarantee of for example 10 years.

For this reason, memory page $P_b$ will be properly copied a second time in the tearing service algorithm in the context of the known method. For this purpose, however, memory page $P_g$ must first be erased in order to obtain a spare page. Moreover, it must be assured, that the information that page $P_b$ must be copied anew does not get lost. This is realized in the known method by introducing copying step 960. In the context of step 960, memory page $P_b$ is in fact written to the end, including, however, the setting of TearingFlag TF1** of memory page $P_b$.

After completion of step 960, the known method is continued with step 950, that is erasing memory page $P_g$ in order to obtain a spare page, as illustrated in FIG. 6.

In this case, however, memory page $P_b$ has TearingFlag TF1 set so that the tearing service algorithm is continued again with step 930, with memory pages $P_b$ and $P_g$ exchanging their roles. This makes it possible to realize the above mentioned necessity of a renewed copying of memory page $P_b$.

In other words, after step 960 has been completed, finally memory page $P_g$ is erased in the context of step 950, and the case differentiation leads back to step 930 so as to perform the copy operation mentioned. As already discussed, the tearing service algorithm is completed and therefore ended in the case that step 960 was not performed, that is that memory page $P_b$ does not have TearingFlag TF1** set.

A substantial disadvantage of the known method consists in the fact that this method is functional in fully initialized sectors only, that is sectors, in which exactly one erased memory page is available as a spare page in the normal operating mode or in the normal case. This is due to the fact that method step 960 can be performed without difficulty only in a fully initialized sector. Under normal operating conditions, that is in normal operating mode, there can only be one erroneous memory page. For this reason, it is obvious which half written memory page is or must be written to the end in the context of method step 960. In the case of an only partly initialized sector, it is possible, however, that more than one memory page may come into question as the possible target memory page for method step 960. For example, if memory page $P_b$ is already available in an erased state and another memory page produces an error in the context of an EDC method or an ECC method due to an insufficient erasure that has up to date not been detected, a loss of information will occur when in the context of the known method discussed in FIG. 6 the content of memory page $P_g$ is copied and/or written over this insufficiently erased memory page. In this case, an erroneous memory page would be generated that might not withstand a later Check in the context of an ECC method or an EDC method. As memory page $P_g$ is erased due to erase step 950 following step 960**, there is the great danger that due to the method of processing a state of a memory according to a known method a loss information and/or data may occur.

Another disadvantage of this known method is the necessary "side entry" into method step 960, which very often causes problems, particularly in the presence of hardware weaknesses. More precisely, this second, very serious, problem is that again a loss of information may occur. Assuming that the tearing service algorithm was performed up to the beginning of step 950, that is erasing memory page $P_g$, so that memory page $P_g$ is already partly erased and therefore contains "wobbly" data, it may occur that this memory page will not be detected as erroneous in a first analysis. In this case the content of this memory page, which may prove to be erroneous in a second readout attempt, is written to memory page $P_b$ in the context of method step 960, so that memory page $P_b$ is subsequently overwritten with wrong information, which could finally lead to a destruction of the data stored in memory page $P_b$. As subsequently memory page $P_g$ is in turn erased in method step 950**, this inevitably in turn leads to a loss of information.

BRIEF DESCRIPTION OF THE DRAWINGS

In the following, embodiments of the present invention will be discussed in greater detail referring to the accompanying drawings.

DESCRIPTION OF THE EMBODIMENTS

The present invention provides a more reliable method and a more reliable apparatus for writing to a target memory page.

In accordance with a first aspect, the present invention provides a method of writing to a target memory page of a memory having an initial memory page having allocated thereto a marking memory containing information indicating whether a content of the initial memory page is written correctly to the target memory page, the method having:
determining whether the target memory page has an error;
if the target memory page has an error,
 erasing the target memory page;
if the marking memory of the initial memory page indicates that the target memory page is not written,
 writing the target memory page based on the initial memory page;
if the target memory page is written correctly,
 changing the marking memory allocated to the initial memory page, so that the marking memory indicates that the target memory page is written correctly; and
if the marking memory of the initial memory page indicates that the target memory page is written correctly,
 erasing the initial memory page.

In accordance with a second aspect, the present invention provides an apparatus for writing to a target memory page of a memory having an initial memory page having allocated thereto a marking memory containing information indicating whether a content of the initial memory page is written correctly to the target memory page, the apparatus having:
a memory controller, which is coupled to the memory, for
 determining whether the target memory page has an error;
 if the target memory page has an error, erasing the target memory page,
 if the marking memory of the initial memory page indicates that the target memory page is not written, writing the target memory page based on the initial memory page;
 if the target memory page is written correctly, changing the marking memory allocated to the initial memory page such that the marking memory indicates that the target memory page is written correctly; and
 if the marking memory of the initial memory page indicates that the target memory page is written correctly, erasing the initial memory page.

In accordance with a third aspect, the present invention provides a program with a program code for performing a method of writing to a target memory page of a memory further having an initial memory page having allocated thereto a marking memory containing information indicating whether a content of the initial memory page is written correctly to the target memory page, the method having:
determining whether the target memory page has an error;
if the target memory page has an error,
 erasing the target memory page;
if the marking memory of the initial memory page indicates that the target memory page is not written,
 writing the target memory page based on the initial memory page;
if the target memory page is written correctly,
 changing the marking memory allocated to the initial memory page, so that the marking memory indicates that the target memory page is written correctly; and
if the marking memory of the initial memory page indicates that the target memory page is written correctly,
 erasing the initial memory page,
if the program is run on a processor.

In accordance with a fourth aspect, the present invention provides a method of writing to a target memory page of a memory for enabling setting a single bit of a memory page and erasing the entire memory page but not enabling erasing a single bit of a memory page, further having an initial memory page having allocated thereto a bit of a marking memory included in the initial memory page, the bit of the marking memory indicating that a content of the initial memory page is written correctly to the target memory page when the bit of the marking memory is set, having:
determining whether the target memory page has an error;
if the target memory page has an error,
 erasing the target memory page;
if the bit of the marking memory is not set,
 writing the target memory page based on the initial memory page;
if the target memory page is written correctly,
 setting the bit of the marking memory allocated to the initial memory page, so that the bit of the marking memory indicates that the target memory page is written correctly; and
if the bit of the marking memory of the initial memory page is set,
 erasing the initial memory page, so that the bit of the marking memory of the initial memory page is erased.

In accordance with a fifth aspect, the present invention provides an apparatus for writing to a target memory page of a memory for enabling setting a single bit of a memory page and erasing the entire memory page but not enabling erasing a single bit of a memory page, further having an initial memory page having allocated thereto a bit of a marking memory included in the initial memory page, the bit indicating that a content of the initial memory page is written correctly to the target memory page, having:
a memory controller, which is coupled to the memory, for
 determining whether the target memory page has an error;
 if the target memory page has an error, erasing the target memory page,
 if the bit is not set, writing the target memory page based on the initial memory page;
 if the target memory page is written correctly, setting the bit of the marking memory allocated to the initial memory page, so that the bit of the marking memory indicates that the target memory page is written correctly; and if the bit of the marking memory of the initial memory page is set, erasing the initial memory page.

In accordance with a sixth aspect, the present invention provides a program with a program code for performing a method of writing to a target memory page of a memory for enabling setting a single bit of a memory page and erasing the entire memory page but not enabling erasing a single bit of a memory page, further having an initial memory page having allocated thereto a bit of a marking memory included in the initial memory page, the bit of the marking memory indicating that a content of the initial memory page is written correctly to the target memory page when the bit of the marking memory is set, having:

determining whether the target memory page has an error;
if the target memory page has an error,
  erasing the target memory page;
if the bit of the marking memory is not set,
  writing the target memory page based on the initial memory page;
if the target memory page is written correctly,
  setting the bit of the marking memory allocated to the initial memory page, so that the bit of the marking memory indicates that the target memory page is written correctly; and
if the bit of the marking memory of the initial memory page is set,
  erasing the initial memory page, so that the bit of the marking memory of the initial memory page is erased.
if the program is run on a processor.

In the inventive method of writing to a target memory page of a memory further comprising an initial memory page, wherein to the initial memory page a marking memory is allocated containing information indicating whether a content of the initial memory page is correctly written to the target memory page, in a first step a determination is made whether the target memory page has an error, if the target memory page has an error, the target memory page will be erased, if the marking memory of the initial memory page indicates that the target memory page is not correctly written, the target memory page will be written based on the initial memory page, if the target memory page is written correctly, the marking memory allocated to the initial memory page will be changed such that the marking memory indicates that the target memory page is written correctly, and if the marking memory of the initial memory page indicates that the target memory page is written correctly, the initial memory page will be erased.

The present invention is based on the finding that in a memory organized in memory pages or pages, the use of a marking memory allocated to the initial memory page, in which an information that the target memory page was written successfully and therefore correctly is deposited, helps to achieve a simplification of the method and/or the algorithm with simultaneous improvement of the protection against attacks and loss of information. The inventive method specifically helps to avoid the occurrence of losses of information due to an interruption of a supply voltage and/or supply power, which is also referred to as tearing, by depositing an information indicating that the target memory area was successfully written in the marking memory allocated to the initial memory page. This makes it possible to clearly differentiate whether the write operation was performed successfully so that the initial memory page may be erased safely and without danger without the occurrence of a loss of information.

In addition, this effectively prevents an attack scenario on the memory or processor means including the memory aiming at a "systematic" change of information and/or data stored in the memory. The inventive method is therefore particularly advantageous in the fact that loss of information due to an interruption of the supply voltage, which could be exploited by an attacker and therefore represents a point of attack on the memory, is prevented.

A further advantage is the fact that there is only very little demand for additional memory for the marking memory. A single additional bit, that may for example be associated to the initial memory page or may also be deposited in a (physically) separate memory area, is sufficient for storing the information that a write operation was performed successfully.

The inventive method is further advantageous in that the method causes no or only very slight deceleration of the writing to a target memory area, as a check whether the target memory page was written correctly may be performed easily and very efficiently. Also extremely low is both the time expenditure and the logistic expenditure concerning further circuits for checking whether the target memory page was written correctly. For example, a check of a parity of a memory page, a data word or a byte may be performed without any additional time expenditure.

The initial erase step of the target memory page, in case the same has an error, performed at the beginning of the inventive method, makes sure that clean and defined conditions are predominant in the memory. This makes it possible to do without complex case differentiations and therefore results in a significant simplification of the algorithm and/or the method.

As the embodiments will show, the use of a DisturbCounter for each memory page and/or a counter for monitoring the number of write operations in a sector of the memory, which does not change the content of the respective memory page, may also be abandoned. The reason for this is that a refresh of a memory page may be effected according to a strategy that is not dependent on an evaluation of a DisturbCounter. The strategy employed here may for example be a strategy operating on the basis of (pseudo) random numbers or any other deterministic or random strategy. This helps to substantially increase both the inventive method and the total speed of the processor means including the memory, as substantial time saving may be realized based on the absence of an evaluation of the DisturbCounters of the memory pages.

A further advantage of the inventive method of writing to a target memory page of a memory is represented by the possibility of being able to operate on sectors that are not fully initialized too, as the embodiments will show. Through this the inventive method of writing to a target memory page enables a considerably more flexible programming of processors, chips, chip cards, and other processor means, as for example formatting and/or full initialization of the memory may be omitted. It is therefore possible to perform a demand-specific part initialization of single sectors or single memory pages of a sector instead of the full initialization. Next to a more flexible programming, this makes it possible to save time and/or increase operating speed as time consuming full initialization of the memory may be dispensed with.

As the embodiments will show, for example the introduction of further bit to the marking memory allocated to the initial memory page a marking indicating that the target memory page is to be written based on the initial memory page may be introduced. This makes it possible to perform further demand-specific method steps based on the value stored in the marking memory and on the state of the target memory page, that is the check whether the target memory page for example shows an error or is erased. For example, if the marking memory of the initial memory page indicates that the target memory page is to be written, which has, however, not yet taken place correctly, the target memory page may be erased in a further erase step. Analogous, if the marking memory indicates that a target memory page is to be written, which has, however, not yet taken place correctly, and the target memory page is present in an erased state, the method may be continued with a further erasing step and subsequent writing of the target memory page or with writing the target memory page.

Moreover, in further method steps it may be checked if, and if so, which memory pages of the memory that are no the target memory page show an error so that the same are erased in a further method step if necessary. This makes it possible to bring the memory as a whole or a sector of the memory as a whole into a defined initial state prior to the actual writing to a target memory page of a memory.

Thus the present invention is based on the fact that on the one hand the disturb problem discussed in the introductory sections of the present application has turned out not to be very relevant. Exact logging of the disturbs is therefore not necessary for normal operation so that the refresh of the memory pages may be ensured by another, for example a randomized, manner. In addition, problems caused by a tearing attack may be intercepted via error correcting codes (ECC) and/or error detecting codes (EDC). The attacker may perhaps be able to disturb a sector of the memory by disturbs, however, it is highly improbable that this would enable him to cause systematic bit changes and/or produce the same. That is, even if the attacker is able to disturb the sector, this being more than doubtful, the data will be arranged randomly rather than systematically. Such a state, however, is easy to detect by means of ECC methods and/or EDC methods.

Apart from that, the expenditure required to occupy for example a chip card or any other processor means including the memory with a large number of disturbs is typically very high. For this and the other reasons described above, the possibility of successfully carrying out a tearing attack on a card or a chip card is very low. This is not least because there is a very high danger that after an unsuccessful tearing attack the chip card can longer be used and is therefore no longer of any use to the attacker.

These two observations are facilitations the inventive method of writing to a target memory area makes use of. It is therefore no longer necessary to specifically log all disturbs without exception so that in the context of the inventive method side entries may be avoided, as these may very often cause problems, specifically in the case of there being hardware weaknesses.

As mentioned above, the inventive method is also able to work with only partly initialized sectors, as is the case in many modern memory concepts and/or chip card concepts.

Referring to FIGS. 1-4, a first embodiment of the inventive apparatus for writing to a target memory page of a memory will now be described. Similar objects and elements with the same or similar functional properties will be referred to in the further course of the application.

Figure 1:
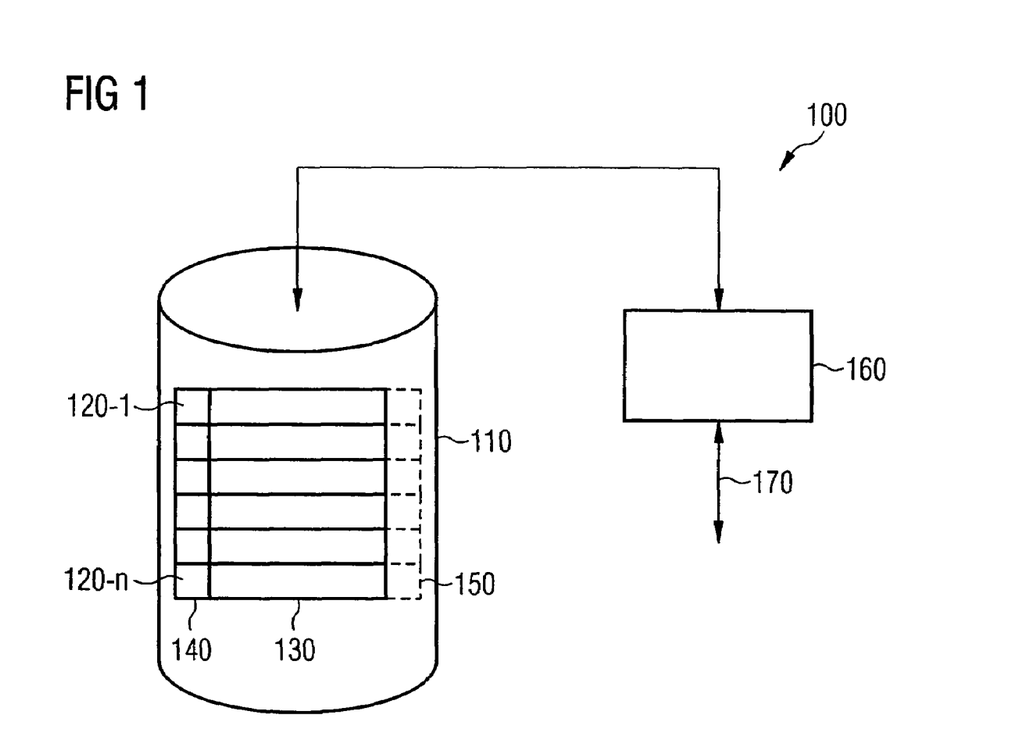
FIG. 1 shows a block diagram of an inventive apparatus for writing to a target memory page.

FIG. 1 shows a schematic block diagram of an inventive apparatus 100 for writing to a target memory page of a memory 110. Memory 110 comprises a plurality of memory pages 120-1 to 120-n, which may for example be organized in sectors. If memory 110 is organized in sectors, it will for example be appropriate to combine memory pages 120-1 to 120-n, which in the context of a write operation influence and/or disturb one another, to form a sector. If for example memory 110 is an EEPROM memory (EEPROM=electrically erasable read only memory), it will be advantageous to combine memory pages and/or memory cells which disturb one another in the context of the write operation by the process known as drain-disturb process, to form a sector. These disturbs result in the fact that in writing to a memory page of a sector, the other memory pages not concerned by the write operation are also affected. This generally makes it necessary for these types of memory, to refresh memory pages 120-1 to 120-n following a strategy, in which by all means random selection on the basis of a (pseudo) random number may also be used. If the memory is an EEPROM memory, the same can be embodied in form of a UCP-EEPROM (UCP-EEPROM=uniform channel programming electrically erasable read only memory), in order to save on space on a chip that includes the memory. Details in this regard have already been discussed in the introductory sections of the present application, which is why here reference is made to the respective sections.

Independent of whether memory 110 is organized in sectors or not, it would be appropriate to provide for at least one so-called spare page in the memory, so that, for example in the context of reprogramming a memory page and/or in the context of a refresh, the page to be reprogrammed is copied directly to a page not containing any data, that is, to the so-called spare page, and a logical address is allocated to the spare page, so that the spare page takes over the role of the original memory page. Following this the original memory page may be reset and therefore become the new spare page. For this purpose, the memory pages often comprise an allocation area, address area or MapBlock, to which the logical address of a memory page is stored. The concept of the spare page has already been explained in greater detail in the introductory sections of the present application, so that here reference is made to these sections.

Memory pages 120-1 to 120-n of memory 110 too optionally comprise, next to a data area 130 and a marking area or marking memory 140, a respective MapBlock 150. Apart from this, memory 110 is coupled to memory controller 160. In addition to that, memory controller 160 is coupled via a bidirectional bus 170 to an external component not shown in FIG. 1, which may be for example a processor or another processor means of a chip card, a computer, a PDA (PDA=personal data assistant).

Marking areas 140 of memory pages 120-1 to 120-n as well as marking areas 830 of memory pages 800-1 to 800-5 serve to receive information. Like marking area 830, marking area 140 of a memory page of the plurality of memory pages 120-1 to 120-n may also include two bits, which have a value of 0 in the normal operating state. More precisely, marking area 140 comprises a first TearingFlag TF1 and a second TearingFlag TF2, whose designations are based on the fact, that the same are used in the context of a so-called tearing service algorithm, which includes the inventive method of writing to a target memory page. Here a "tearing" identifies an interruption of a supply voltage and/or supply power, as has already been explained in the introductory sections of the present application, to which here reference is made.

Optionally, each memory page 120-1 to 120-n may in addition comprise a counter area, to which a counter value is stored, which for example indicates a number of write operations or other system events. An age counter indicating a number of write operations to the memory and/or the respective sector of the memory may for example be implemented in the counter area so as to ensure for example that the memory is not written to more often than a certain limit allows. This age counter helps to guarantee that the memory is in operation no longer than is safely made possible by the respective EEPROM cells without there being any loss of data, as EEPROM cells in particular may be subjected to only a certain number of write operations before showing critical error liability due to symptoms of aging.

Figure 2:
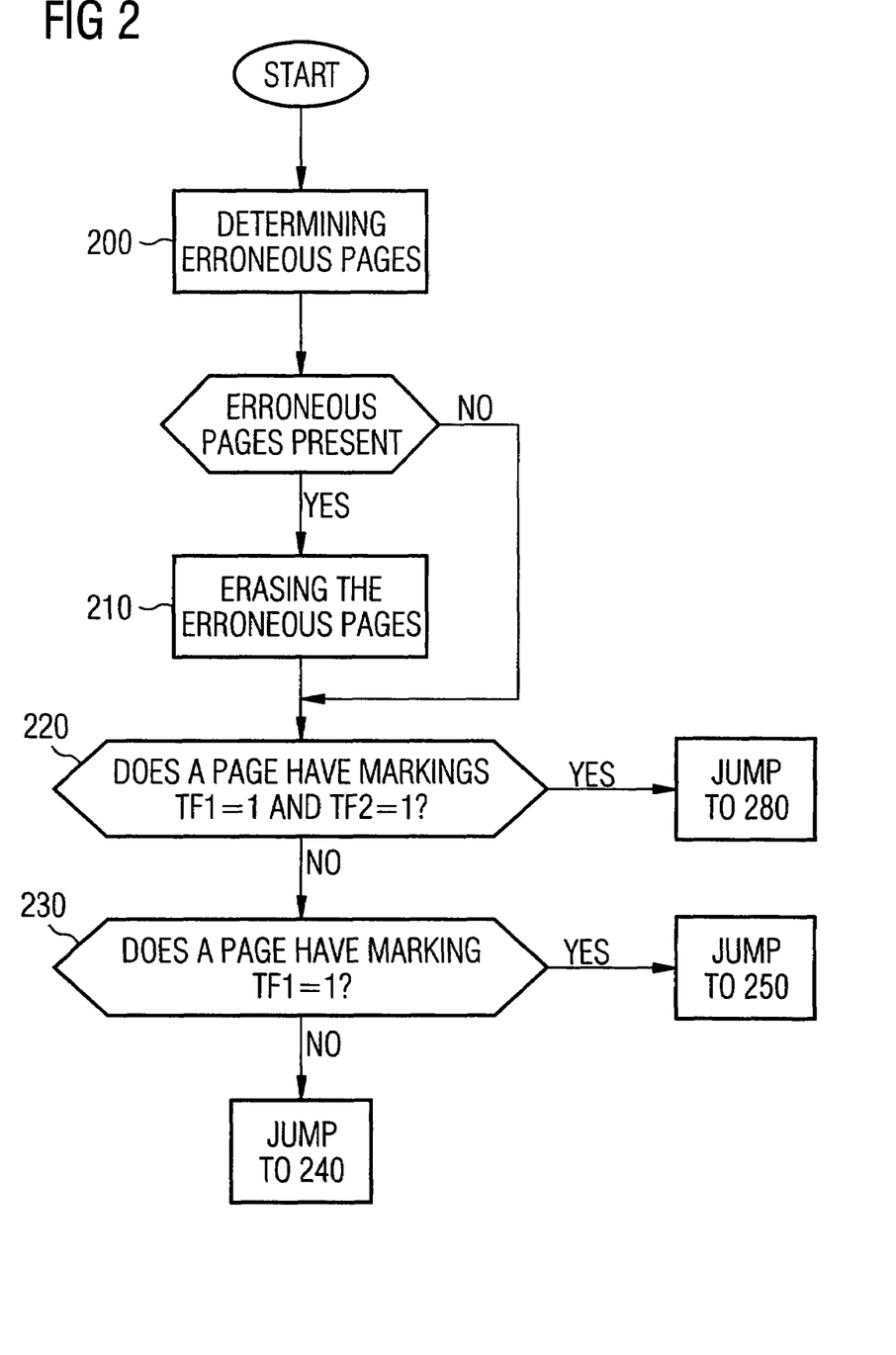
FIG. 2 shows a partial flow chart of the inventive method of writing to a target memory page.
Figure 3:
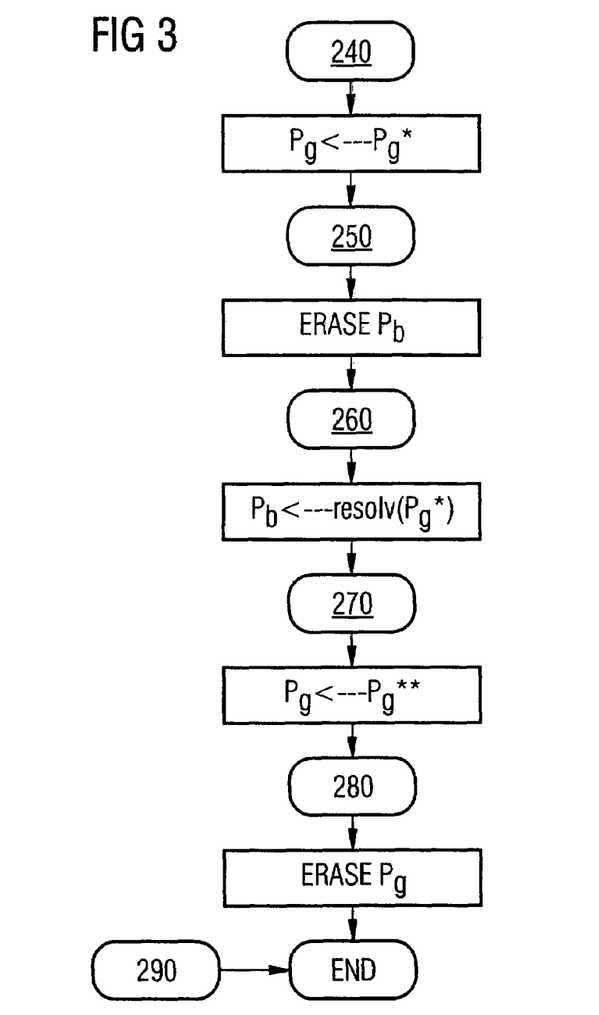
FIG. 3 shows a partial flow chart of the inventive method of writing to a target memory page.

FIGS. 2 and 3 each show a partial flow chart of an embodiment of the inventive method of writing to a target memory page $P_b$ of a memory 110. Here FIG. 2 shows the preparatory steps as well as a necessary differentiation of cases, while in FIG. 3 the partial flow chart shows the further steps of the inventive method of writing to a target memory page $P_b$.

After starting the inventive method, for example in the context of a tearing service algorithm, the erroneous pages or memory pages in a sector and/or in memory 110 are determined in a first step 200. If one or more memory pages 120-1 to 120-n have been detected to be erroneous in the context of step 200, the same will be erased in a step 210. If no page has been detected to be an erroneous page in the context of step 200, the step of erasing the erroneous pages 210 is skipped.

An error detection method, as it can be used in connection with the inventive method of writing to a target memory page of a memory 110 and in the context of an inventive apparatus, consists in reading a test value from memory 110 and also reading the content from the respective memory page, and then calculating and/or determining a comparison value based on the content of the memory page, and comparing the same with the test value. If the two values have a certain relation to each other, that is, if the two are consistent with each other, there is no error. An example for such an error detecting code is represented by the parity check.

In a next step 220, a check is made whether memory 110 has a memory page with marking area 140 in which both TearingFlags TF1 and TF2 are set. Should this not be the case, in a step 240 the plurality of memory pages 120-1 to 120-n are browsed for a page in which marking area 140 has a first TearingFlag TF1 set. If this is not the case, that is, if there is no memory page in memory 110 in which the first Tearing-Flag TF1 is set and/or written, the inventive method of writing will be continued with a step 240 of marking an initial memory page $P_g$, as shown in FIG. 3. In the step of marking initial memory page $P_g$ 240, the first TearingFlag TF1 is set so that its value is changed from 0 to 1. In FIG. 3 this is characterized by the designation $P_g^*$. Such marking of a memory page is possibly in the context of the UCP-EEPROM concept, as has already been discussed in the introductory sections of the present application, to which is hereby referred to. In a next step 250, target memory page $P_b$ is erased. This turns target memory page $P_b$ into a spare page of memory 110.

In a next step 260, a content based on the content of the initial memory page is written to target memory page or spare page $P_b$. In the context of this writing, which is also referred to as resolv($P_g^*$) in FIG. 3, at least the set first TearingFlag TF1 of initial memory page $P_g$ is not copied. In addition, the content of data area 130 of initial memory page $P_g$ may optionally be changed in the context of step 260. In the case of a simple refresh, a respective change of data area 130 is usually not necessary. If memory pages 120-1 to 120-n have an optional counter area, the same will be increased correspondingly in the context of the writing and/or the copying. In other words, a content referred to as resolvent of initial memory page $P_g$, also designated as resolv($P_g^*$) or r of ($P_g^*$) in FIGS. 3-5, is written to target memory page $P_b$ in the context of step 260 of writing.

In a next step 270, initial memory page $P_g$ is marked anew by setting the second TearingFlag TF2, as is identified in FIG. 3 by means of the designation $P_g^{}$. After that, initial memory page $P_g$, or, more precisely, initial memory page $P_g^{}$ is erased in a subsequent step 280, so that initial memory page $P_g$ now represents the spare page of memory 110 and/or the respective sector.

Figure 4:
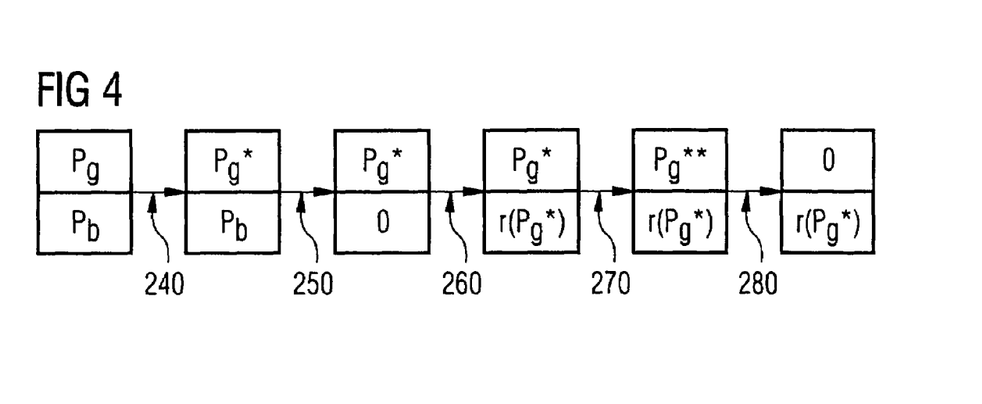
FIG. 4 is a representation of the memory contents of two memory pages in the context of the inventive method.

FIG. 4 shows contents of both initial memory page $P_g$ and target memory page $P_g$ as a sequence of six rectangles. Here the respective upper halves of the rectangles designate the content of initial memory page $P_b$, while the lower halves of the rectangles represent the content of target memory page $P_b$. Starting from a state in which initial memory page $P_g$ has a content which is also designated as $P_g$ in FIG. 4 and target memory page $P_b$ has a content designated as $P_b$, initial memory page $P_g$ is marked by setting the first TearingFlag TF1 in the context of step 240, which is designated as $P_g^*$ in FIG. 4. Subsequently, target memory page $P_b$ is erased in step 250, which is marked in FIG. 4 by entering a digit 0. Consequently, the resolvent of initial memory page $P_g$ is written to target memory page $P_b$ in the context of step 260, which is designated as r($P_g^*$) in FIG. 4. Subsequently, the successful and correct writing of target memory page $P_b$ is designated by setting the second TearingFlag TF2 of the initial memory page in a step 270. In the final step 280, initial memory page $P_g$ is erased and therefore turned into the spare page, which is again designated in FIG. 4 by entering the digit 0.

One essential aspect of the inventive method of writing to a target memory page of a memory 110 is represented by marking the initial memory page by means of setting the second TearingFlag TF2, when the target memory page has been written correctly. Through this and through the initial check specifically of the target memory page in the context of step 200 and erasing the same if the target memory page shows an error, a loss of information, as caused for example by a tearing attack, is eliminated. In order to explain this more closely, various scenarios of supply voltage interruptions (tearing) will be outlined and discussed in the further course of the present application.

An interruption (tearing) of the supply voltage and/or the supply power in the context of one of method steps 200, 220 or 230 has no influence on the data integrity of the data stored in memory 110, as no erasure or writing to a memory page is performed in the context of these steps. If a tearing takes place in the context of the step of erasing the erroneous memory pages 210, erased or erroneous memory pages caused by incomplete erasure of the memory pages will be generated depending on the stage of the erase operation, at which the tearing has taken place.

Specifically in the field of EEPROM memories and/or EEPROM memory cells both the erasure and the writing require a certain period of time, in which charge is built up or reduced on a floating gate of an EEPROM transistor and/or of a flash FET (FET=field-effect transistor). If the supply voltage and/or the power supply is interrupted in the context of this period of time, that is, if a tearing takes place, this process will not be completed, so that dependent on the time of the voltage interruption and the respective EEPROM memory cell, the same will not have yet changed its state. In other words, the result may be, that a memory cell to be erased has charge left on its floating gate, so that the respective memory cell is detected as being set in a readout thereof. However, if the erase operation in a further memory cell of the same memory page has reached such a stage, that the same is definitely detected as being erased, an error will be detected in the context of an error check. In addition, such a charge may remain on a floating gate of an EEPROM memory cell that it depends on operating parameters of memory 110, if the memory cell concerned has a value of 1 or 0. Examples of this are fluctuations of the supply voltage or other influences.

If in the context of step 240, that is marking initial memory page $P_g$, the setting the first TearingFlag TF1 results in a tearing, the further processing will depend on whether the first TearingFlag TF1 of initial memory page $P_g$ is detected as being set or as not being set in the case of a reentry into the tearing service algorithm. If initial memory page $P_g$ has a first TearingFlag TF1 set, the inventive method will branch to step 250 of erasing target memory page $P_b$ in step 230. Otherwise, a jump is made to method step 240 so that TearingFlag TF1 of initial memory page $P_g$ is written anew.

If a tearing occurs in the context of step 250 of erasing target memory page $P_b$, it is highly probable, that there will be an erroneous page, also termed as "invalid" memory page, so that the same will be erased in the context of method steps 200 and 210 after the resumption of the tearing service algorithm.

If a tearing occurs in the context of method step 260, that is the writing of the target memory page $P_b$, it is also highly probable, that an erroneous memory page will remain, which will be erased in the context of method steps 200 and 210 after resumption of the tearing service algorithm. Subsequently, the marking by the first TearingFlag TF1 of initial memory page $P_b$ is performed in method step 230, so that a jump is made into method step 250, that is the method step of erasing target memory page $P_b$, in the two cases last discussed.

If a tearing occurs in the context of method step 270, that is the second marking of initial memory page $P_g$, further error processing depends on whether the second TearingFlag TF2 will be detected as being set or not in the context of the resumption of the tearing service algorithm. If this is the case, the method will be continued with step 280 in the context of method step 220, so that initial memory page $P_g$ will be erased. If this is not the case, the inventive method will be continued with method step 250, that is erasing target memory page $P_b$, based on the check in the context of method step 230.

If a tearing occurs in the context of method step 280, that is the erasure of initial memory page $P_g$, it is highly probable that again an erroneous page will remain in memory 110, so that the same will be erased in method steps 200 and 210 at a next call of the tearing service algorithm.

The inventive method of writing to a target memory page of a memory thus differs from the known tearing service algorithm according to the known method particularly with respect to the following points, which have been altered. Method step 960, representing a "side entry" for the case in which a tearing has already taken place, could be cancelled without substitution. Method steps 930 and 940 of the known method, which correspond to method steps 270 and 260 of the inventive method, have been exchanged with respect to their order. While the second TearingFlag TF2 has marked the erasure of target memory page $P_b$ in the known method, the setting of the second TearingFlag TF2 indicates the successful writing of target memory page $P_b$ in the inventive method. Moreover, the loop at the end, that is the loop initiated in the case of the marking of target memory page $P_g$ by the first TearingFlag TF1 and leading back to step 930, may also be cancelled without substitution in the context of the inventive method in contrast to the known method. Moreover, the inventive method of writing to a target memory page of a memory 110 comprises an erase routine in the form of method steps 200 and 210, which the known method does not contain.

Based on the omission of the "side entry" in the form of method step 960 in the context of the known method compared to the inventive method, in which specifically in the case of hardware weaknesses problems may arise, it is possible to operate in partly initialized sectors and/or partly initialized memories also, as the inventive method is no longer dependent on there being precisely one spare page contained in the sector and/or memory 110. This is considerably advantageous in that modern chip card concepts and modern memory concepts are made such that no longer all of the memory pages must be used, except for the memory page identified as the spare page. Thus several erased memory pages may exist next to one another in the context of the modern concepts. For example, if a sector comprises 32 data memory pages, so that, together with the spare page, the same comprises a total of 33 memory pages, no longer all of the 32 data memory pages (data pages) will have to be used in the context of the modern concepts.

For example, if hardware weaknesses result in memory pages with "wobbly" data, that is memory pages in which a readout result depends on factors which cannot be determined or fixed with sufficient accuracy in the normal mode of operation, this may lead to a loss of data in the context of the known method, just as is the case when more than one memory page is empty and/or erroneous.

Both problems are now solved with the new method. Particularly method steps 910 and 920 of the known method and method steps 240 and 250 of the inventive method are identical. In other words, the two methods match up to the step or the "jump label" 930 or 260 respectively.

However, as disturbs must no longer be counted in the context of the inventive method, method step 960 of the known method does no longer have to be used, so that the inventive method may also operate on sectors and/or memories 110 comprising more than one spare page and/or more than one erased and/or erroneous memory page. An important reason for this is that the number of disturbs does no longer have to be counted, that is, erroneous memory pages do no longer have to be written to the end, but a memory page, for example target memory page $P_b$, may simply be erased when it turns out to be erroneous.

Though this means that the underlying disturb will be "forgotten", this will not cause any problems as was discussed above. Instead, initial memory page $P_g$ may be written afresh to target memory page $P_b$ after the erase operation. For this reason, a differentiation of "erasing target memory page $P_b$" (step 920) and "writing target memory page $P_b$" (step 940), as was performed in the context of the known method by means of the step of marking 930 by setting the second TearingFlag TF2, is no longer necessary. Rather, in the context of the inventive method, for this reason the step of erasure 250 (step 920 of the known method) is directly followed by the step of writing 260 (step 940 according to the known method).

Thus, if an erroneous memory page occurs, specifically target memory page $P_b$, the same will be erased at the beginning of the method in the context of steps 200 and 210, and a jump to step 260 of writing target memory page $P_b$ may be initiated. Alternatively, in this constellation it is also possible to jump to step 250, that is erasing target memory page $P_b$.

This has made it possible to use step 930 of the known method, that is marking target memory page $P_b$ by setting the second TearingFlag TF2, in order to separate the method step of writing target memory page $P_b$ 260 (compare step 940 of the known method) from step 280 of erasing the doubly marked initial memory page $P_g$ (compare step 950 of the known method). This helps to properly solve the problem of the loss of data in the case of "wobbly" data, as the destruction or the erasure of the information concerned, which is stored in initial memory page $P_g$, is not initiated until the second TearingFlag TF2** of initial memory page $P_g$ has been set, as this may be effected non-destructively in the context of the UCP-memory concept.

If, as has already been noted above, other poorly erased memory pages occur, the same will be erased at the beginning in the context of the erase block, which includes method steps 200 and 210. Therefore, a differentiation between such memory pages and the half erased and/or half written memory page $P_b$ will no longer be necessary if a tearing occurs.

A further embodiment of the present invention is characterized in that the inventive method of writing to a target memory page of a memory is not performed on principle, but only in the context of the so-called tearing service algorithm, so that a substantial change of the data area 130 in the context of writing the resolvents of the initial memory page to the target memory page will not occur. The method, which was also explained in FIGS. 2-4, does change in this context. In this case, the setting of the first TearingFlag TF1 in the context of step 240 identifies the entry into the tearing service algorithm.

If one of the cases A or B described in the introductory sections of the present invention occur, that is, if there is an interruption of the supply voltage and/or the supply power (tearing) in the context of a write operation (case A) or at the end of a write routine and/or at the beginning of a subsequent erase routine (case B), there will either be a sector and/or memory 110 having an "invalid" and/or erroneous memory page in the case of A, or there will be two memory pages having the same logical address in MapBlock 150 in the case of B. In this case it is for example appropriate to interpret the younger memory page as the initial memory page $P_g$ and the older memory page as the target memory page $P_b$.

In case B, that is, in the case of the so-called DoubleMapping, in which two memory pages are allocated to the same logical address in MapBlock 150, the objective is to erase the memory page termed as the target memory page $P_b$ and to subsequently properly write and/or program initial memory page $P_g$ to the target memory page. In order to achieve this, the inventive method of writing to a target memory page is performed in the context of the tearing service algorithm. As in this case the sector and/or memory 110 does not have any erroneous memory pages, the process will be started with step 240. In the context of step 240, initial memory page $P_g$ is marked. In order to achieve this, a bit of marking area 140 of the memory page $P_g$ concerned is set, as has already been explained. Alternatively, an unused bit from MapBlock 150 can also be used, so that a designated marking area 140 may optionally be omitted. This bit must always be there in an erased state in normal operation, that is, it must have a value of 0 in the normal mode of operation. It is used only in the context of the tearing service algorithm and/or in the context of the tearing service. This bit, which in the further course will again be referred to as first TearingFlag, is postprogrammed and thereby "pulled" to the value 1. All other bits of the memory page concerned remain unchanged or the same. As has already been explained, this is an action that the UCP concept allows. In FIGS. 2-4 a memory page marked with the first TearingFlag TF1 is designated with an asterisk. Thus in the context of step 240, initial memory page $P_g$ is turned into memory page $P_g^*$.

In step 250, target memory page $P_b$ is erased. This may now be effected without problems as, if now a new tearing or interruption of the supply voltage occurs, the same will be signaled by the set TearingFlag TF1 of initial memory page $P_g$. Thus the first TearingFlag TF1 signals that the tearing service algorithm and/or a tearing service has been performed and should be completed at a later stage.

In the context of step 260, now the erased memory page, that is the new spare page and/or target memory page $P_b$, is copied. Initial memory page $P_g^*$ with a correspondingly increased age counter is designated as resolvent resolv($P_g^*$). In addition, resolvent resolv($P_g^*$) also has a non-set and/or erased TearingFlag TF1 in contrast to memory page $P_g^*$.

In a next step 270, initial memory page $P_g$ comprising the content $P_g^*$ is marked a second time. For this purpose, a second TearingFlag TF2 may be used in the context of marking area 140. Alternatively, a further unused bit of the respective memory page similar to the first TearingFlag TF1 may be used. Independent of whether this is a bit of the marking area 140 or another unused bit, this bit is termed the second TearingFlag TF2. The second TearingFlag TF2 too and/or the respective bit is erased in normal operating mode and is set to 1 only during a tearing service. This occurs at this point of the current process, that is in the context of method step 270. Thus memory page $P_g$ is now marked doubly, which is designated with $P_g^{**}$ in FIGS. 3 and 4.

In the context of method step 280, now the old memory page and/or initial memory page $P_g^{**}$ is erased thus completing the tearing service and/or the tearing service algorithm. Step 280 again produces a spare page and the sector is in a valid state again.

In the case of the presence of case A, that is, if the sector and/or memory 110 has an erroneous and/or "invalid" memory page, the same is erased in the context of method steps 200 and 210, and subsequently the inventive method of writing to a target memory page has been completed in the context of the tearing service algorithm as explained and/or a move is made to the end of the inventive method.

These embodiments have shown that the inventive method and the inventive apparatus allow safe programming of a UCP-EEPROM with spare pages under tearing conditions. Even though a UCP-EEPROM memory has been described in the context of the present embodiments, the inventive method and the inventive apparatus are not limited to such memories. Basically, the inventive method and the inventive apparatus are applicable to all UCP-like read only memories, that is, to all types of memories that are organized in memory pages and allow programming of single bits but only allow an erasure of a memory page as a whole.

In addition, it has been assumed in the context of the present application, that a bit of a memory has a value of 0 in the erased state and a value of 1 in the programmed and/or written and/or set state. Basically, the inventive method and the inventive apparatus are however not limited to this allocation. Thus an erased bit of a memory may very well have the value 1 and a programmed bit may have the value 0.

As an alternative to MapBlock 150 shown in FIG. 4, the optional MapBlock 150 may also be part of a (physically) separate memory area.

Depending on the circumstances, the inventive method of writing to a target memory page of a memory may be implemented in hardware or in software. The implementation may be effected on a digital storage medium, specifically a floppy disc, CD or DVD with electronically readable control signals, which may cooperate with a programmable computer system such that the inventive method of writing to a target memory page of a memory is carried out. In general, the invention thus also consists in a software program product and/or a computer program product and/or a program product with a program code for performing the inventive method stored on a machine-readable carrier, when the software program product is run on a computer or a processor. In other words, the invention may thus be realized as a computer program and/or software program and/or program with a program code for performing the method, when the program is run on a processor. Here the processor may be formed by a computer, a chip card (smart card) or another integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of writing to a target memory page of a memory including an initial memory page having allocated thereto a marking memory containing information indicating whether a content of the initial memory page is written correctly to the target memory page, the method comprising:
   determining whether the target memory page comprises an error;
   if the target memory page comprises an error,
      erasing the target memory page;
   if the marking memory of the initial memory page indicates that the target memory page is not written,
      writing the target memory page based on the initial memory page;
   if the target memory page is written correctly,
      changing the marking memory allocated to the initial memory page, so that the marking memory indicates that the target memory page is written correctly; and
   if the marking memory of the initial memory page indicates that the target memory page is written correctly,
      erasing the initial memory page.

2. The method according to claim 1, wherein, if the marking memory indicates that the target memory page is not written correctly, prior to the step of writing the target memory page, changing the marking memory to indicate that the target memory page will have to be written based on the initial memory page, and, if the marking memory indicates, that the target memory page is written correctly, after the step of erasing the initial memory page, changing the marking memory to no longer indicate that the target memory page will have to be written based on the initial memory page.

3. The method according to claim 2, wherein the marking memory comprises a first bit and a second bit, wherein the step of changing the marking memory to indicate that the target memory page is written correctly, comprises setting the second bit, wherein the step of changing the marking memory, to indicate that the target memory page is to be written based on the initial memory page, comprises setting the first bit, and wherein the step of erasing the initial memory page includes erasing the first bit and the second bit.

4. The method according to claim 2, wherein, if the marking memory indicates that the target memory page is to be written based on the initial memory page, and does not indicate that the target memory page is written correctly, and the target memory page is not erased, prior to the step of writing the target memory page, further comprising erasing the target memory page.

5. The method according to claim 2, wherein, if the marking memory indicates that the target memory page is to be written based on the initial memory page, and does not indicate that the target memory page is written correctly, and the target memory page is erased, prior to the step of writing the target memory page, further comprising erasing the target memory page.

6. The method according to claim 1, further comprising, prior to the step of writing the target memory page based on the initial memory page:
   checking all memory pages that are not the target memory page for a presence of an error;
   if one or a plurality of memory pages comprises an error, erasing the memory page comprising an error or erasing each of the plurality of memory pages comprising an error.

7. The method according to claim 1, wherein a step of determining or checking a memory page or a plurality of memory pages comprises reading a content of a memory page or a plurality of memory pages, reading a test value, calculating a comparison value based on the content of the memory page or the content of the plurality of memory pages, and comparing the test value and the comparison value as to determine whether the test value and the comparison value comprise a predetermined relation to each other.

8. An apparatus for writing to a target memory page of a memory including an initial memory page having allocated thereto a marking memory containing information indicating whether a content of the initial memory page is written correctly to the target memory page, the apparatus comprising:
   a memory controller, which is coupled to the memory, for determining whether the target memory page comprises an error;
   if the target memory page comprises an error, erasing the target memory page,
   if the marking memory of the initial memory page indicates that the target memory page is not written, writing the target memory page based on the initial memory page;
   if the target memory page is written correctly, changing the marking memory allocated to the initial memory page such that the marking memory indicates that the target memory page is written correctly; and
   if the marking memory of the initial memory page indicates that the target memory page is written correctly, erasing the initial memory page.

9. The apparatus according to claim 8, wherein the memory controller is further, if the marking memory indicates that the target memory page is not written correctly, prior to writing the target memory page, for changing the marking memory to indicate that the target memory page is to be written based on the initial memory page and that, if the marking memory indicates that the target memory page is written correctly, after erasing the initial memory page, for changing the marking memory to no longer indicate that the target memory page is to be written based on the initial memory page.

10. The apparatus according to claim 8, wherein the marking memory comprises a first bit and a second bit, and wherein the memory controller is further, in changing the marking memory allocated to the initial memory page for indicating that the target memory page is written correctly, for setting the second bit, and wherein the memory controller is further for setting the second bit in order to change the marking memory to indicate that the target memory page is to be written based on the initial memory page.

11. The apparatus according to claim 8, wherein the memory controller is further for erasing the target memory page prior to writing the target memory page, if the marking memory indicates that the target memory page is to be written based on the initial memory page, and does not indicate that the target memory page is written correctly, and the target memory page is for not erasing.

12. The apparatus according to claim 8, wherein the memory controller is further for erasing the target memory page prior to writing the target memory page, if the marking memory indicates that the target memory page is to be written based on the initial memory page, and does not indicate that the target memory page is written correctly, and the target memory page is for erasing.

13. The apparatus according to claim 8, wherein the memory controller is further for checking all memory pages that are not the target memory page based on the initial memory page for a presence of an error, and, if one or a plurality of memory pages includes an error, for erasing the memory page including an error or each of the plurality of memory pages including an error.

14. The apparatus according to claim 8, wherein the memory controller is further, upon the check or the determination of a presence of an error of a memory page or a plurality of memory pages, for reading the value of the memory page or the plurality of memory pages, for reading a test value, for calculating a comparison value based on the content of the memory page and/or based on the contents of the plurality of memory pages, and for comparing the test value and the comparison value for a presence of a predetermined relation.

15. The apparatus according to claim 8, wherein the memory controller is further for refreshing a memory page of the plurality of memory pages based on a refresh strategy without a refresh counter.

16. The apparatus according to claim 15, wherein the memory controller realizes the refresh strategy based on a (pseudo) random number.

17. A machine-readable medium comprising a program with a program code for performing a method of writing to a target memory page of a memory including an initial memory page, having allocated thereto a marking memory containing information indicating whether a content of the initial memory page is written correctly to the target memory page, the method comprising:
    determining whether the target memory page comprises an error;
    if the target memory page comprises an error,
        erasing the target memory page;
    if the marking memory of the initial memory page indicates that the target memory page is not written,
        writing the target memory page based on the initial memory page;
    if the target memory page is written correctly,
        changing the marking memory allocated to the initial memory page, so that the marking memory indicates that the target memory page is written correctly; and
    if the marking memory of the initial memory page indicates that the target memory page is written correctly,
        erasing the initial memory page,
    if the program is run on a processor.

18. A method of writing to a target memory page of a memory for enabling setting a single bit of a memory page and erasing the entire memory page but not enabling erasing a single bit of a memory page, further including an initial memory page having allocated thereto a bit of a marking memory included in the initial memory page, the bit of the marking memory indicating that a content of the initial memory page is written correctly to the target memory page when the bit of the marking memory is set, comprising:
    determining whether the target memory page comprises an error;
    if the target memory page comprises an error,
        erasing the target memory page;
    if the bit of the marking memory is not set,
        writing the target memory page based on the initial memory page;
    if the target memory page is written correctly,
        setting the bit of the marking memory allocated to the initial memory page, so that the bit of the marking memory indicates that the target memory page is written correctly; and
    if the bit of the marking memory of the initial memory page is set,
        erasing the initial memory page, so that the bit of the marking memory of the initial memory page is erased.

19. An apparatus for writing to a target memory page of a memory for enabling setting a single bit of a memory page and erasing the entire memory page but not enabling erasing a single bit of a memory page, further including an initial memory page having allocated thereto a bit of a marking memory included in the initial memory page, the bit indicating that a content of the initial memory page is written correctly to the target memory page, comprising:
    a memory controller, which is coupled to the memory, for
        determining whether the target memory page comprises an error;
        if the target memory page comprises an error, erasing the target memory page,
        if the bit is not set, writing the target memory page based on the initial memory page;
        if the target memory page is written correctly, setting the bit of the marking memory allocated to the initial memory page, so that the bit of the marking memory indicates that the target memory page is written correctly; and
        if the bit of the marking memory of the initial memory page is set, erasing the initial memory page.

20. A machine-readable medium comprising a program with a program code for performing a method of writing to a target memory page of a memory for enabling setting a single bit of a memory page and erasing the entire memory page but not enabling erasing a single bit of a memory page, further including an initial memory page having allocated thereto a bit of a marking memory included in the initial memory page, the bit of the marking memory indicating that a content of the initial memory page is written correctly to the target memory page when the bit of the marking memory is set, comprising:
    determining whether the target memory page comprises an error;
    if the target memory page comprises an error,
        erasing the target memory page;
    if the bit of the marking memory is not set,
        writing the target memory page based on the initial memory page;
    if the target memory page is written correctly,
        setting the bit of the marking memory allocated to the initial memory page, so that the bit of the marking memory indicates that the target memory page is written correctly; and
    if the bit of the marking memory of the initial memory page is set,
        erasing the initial memory page, so that the bit of the marking memory of the initial memory page is erased,
    if the program is run on a processor.

* * * * *